United States Patent [19]

Kasahara et al.

[11] Patent Number: 4,734,137
[45] Date of Patent: Mar. 29, 1988

[54] PROCESS FOR PREPARATION OF ORGANIC PIGMENTS

[75] Inventors: Shigekazu Kasahara; Takashi Saito; Fumio Arai, all of Toyama, Japan

[73] Assignee: Toyo Soda Manufacturing Co., Ltd., Shinnanyo, Japan

[21] Appl. No.: 860,423

[22] Filed: May 7, 1986

[30] Foreign Application Priority Data

May 10, 1985 [JP] Japan ................................. 60-97864

[51] Int. Cl.$^4$ ............................................. C09B 67/10
[52] U.S. Cl. ................................ 106/308 M; 106/309; 524/87; 524/104; 524/106; 524/173; 524/555
[58] Field of Search ................... 106/308 M, 309, 23; 524/87, 104, 106, 173, 555

[56] References Cited

U.S. PATENT DOCUMENTS 3,806,464  4/1974  Matrick et al. ..................... 252/316
4,256,502  3/1981  Kranz et al. ........................ 106/288
4,455,173  6/1984  Jaffe .................................... 106/288
4,474,473  10/1984  Higuchi et al. ...................... 366/75

OTHER PUBLICATIONS

Derwent Abstract Accession No. 80-59618c/34, Japanese Patent No. 55090959, Jul. 10, 1980.
Derwent Abstract Accession No. 86-115567/18, Japanese Patent No. 61055175, Mar. 19, 1986.
Derwent Abstract Accession No. 86-165886/26, Japanese Patent No. 61098779, May 17, 1986.
Derwent Abstract Accession No. 78-57726A/32, Japanese Patent No. 53076185, Jul. 6, 1978.
Derwent Abstract Accession No. 86-167236/26, Japanese Patent No. 61101577, May 5, 1986.
Derwent Abstract Accession No. 85-083292/14, Japanese Patent No. 60032850, Feb. 20, 1985.
Derwent Abstract Accession No. 85-084119/14, Japanese Patent No. 60035055, Feb. 22, 1985.
Derwent Abstract Accession No. 85-034394/06, Japanese Patent No. 59227940, Dec. 20, 1984.
Derwent Abstract Accession No. 85-279285/45, Japanese Patent No. 60188472, Sep. 25, 1985.

Primary Examiner—Amelia Burgess Yarbrough
Attorney, Agent, or Firm—Cushman, Darby & Cushman

[57] ABSTRACT

Organic pigments are prepared by dissolving at least one organic pigment in a non-protonic polar solvent in the presence of a caustic alkali and water, and adding to the solution an acid having an acrylic resin dissolved therein to effect neutralization and reprecipitation.

6 Claims, No Drawings

PROCESS FOR PREPARATION OF ORGANIC PIGMENTS

BACKGROUND OF THE INVENTION (1) Field of the Invention

The present invention relates to a process for the preparation of organic pigments having excellent dispersibility, color sharpness, gloss, coloring power, and flowability.

As is well known, organic pigments generally have a sharp color, and they are valuable as colorants for lacquers, printing inks and the like. Dispersibility, gloss, flowability, and coloring power are important as practical properties required for organic pigments.

(2) Description of the Related Art

As methods for improving the practical properties of organic pigments, there have been proposed (1) a method in which the surface of a pigment is covered with a surface active agent or a resin, (2) a method in which a substituted derivative of a pigment is incorporated in the base pigment, and (3) a method in which a pigment is converted to a processed pigment such as a paste color or master batch color.

The method (1) has a problem such that the improvement of the flowability and gloss is insufficient and the coloring power is reduced. In the method (2), since the pigment has an inherent color, application to a pigment of a different hue cannot be made, and derivatives must be prepared for respective pigments. Accordingly, the method (2) is industrially disadvantageous. In the method (3), a large electric power, much labor, and a long time are required for processing, and therefore, the manufacturing cost is high. Furthermore, since a specific vehicle or resin has to be used, the application range is limited and the method (3) does not have a sufficient general-purpose characteristic. Accordingly, none of these known methods are practically satisfactory. Moreover, each of the known methods is an ex post facto method, and substantial prevention of an aggregation of pigment particles is almost impossible. Accordingly, in any of these known methods, satisfactory results cannot be always obtained in the modification of pigments.

SUMMARY OF THE INVENTION

It is a primary object of the present invention to provide a process for the preparation of organic pigments, which is different from the conventional ex post facto methods and in which purification and a fine division of a crude pigment and contact of formed primary particles with an acrylic resin are simultaneously carried out and the pigment is effectively modified while substantially preventing an aggregation of primary particles.

The operation of the process of the present invention is simple and economical, and therefore, the process of the present invention is industrially advantageous.

In accordance with the present invention, there is provided a process for the preparation of organic pigments, which comprises dissolving at least one organic pigment in a non-protonic polar solvent in the presence of a caustic alkali and water, and adding to the solution an acid having an acrylic resin dissolved therein to effect neutralization and reprecipitation.

Any aggregation of primary articles is substantially prevented simultaneously with purification and fine division, and such characteristics as gloss (sharp gloss), flowability, and coloring power are remarkably improved.

DESCRIPTION OF THE PREFERRED EMBODIMENTS

The present invention will now be described in detail.

A pigment capable of forming a salt with a caustic alkali and of being dissolved in a non-protonic polar solvent should be used, and at least one pigment selected from quinacridone, azo, and thioindigo pigments having such properties, for example, unsubstituted quinacridone, 2,9-dimethylquinacridone, 3,10-dichloroquinacridone and 4,11-dichloroquinacridone, is used.

As the non-protonic polar solvent used in the present invention, there can be mentioned dimethylsulfoxide, dimethylimidazolidinone and N-methyl-2-pyrrolidone. In view of the dissolving power and the recovery of the solvent, dimethylsulfoxide is preferred.

If the solvent is in a completely anhydrous state, complete dissolution of the pigment is difficult, and if a small amount of water is present in the solvent, the dissolving power is increased and the dissolution is facilitated. However, if the water content exceeds 20%, the dissolving power is reduced and the dissolution becomes difficult. The best effect is ordinarily obtained when the solvent contains about 10 to about 15% by weight of water. In a completely anhydrous state, the caustic alkali has a poor solubility in the solvent and the reaction of forming a salt with the pigment is inhibited. Potassium hydroxide and sodium hydroxide are preferred as the caustic alkali used in the dissolving operation.

The solution having the pigment dissolved therein is subjected to neutralization and reprecipitation with an acid having an acrylic resin dissolved therein. The acrylic resin brings about an advantageous effect characterizing the present invention, and the acrylic resin is a homopolymer or copolymer soluble in an acidic aqueous solution, which is obtained by homopolymerizing a monomer represented by the following general formula or copolymerizing that monomer with another monomer copolymerizable therewith:

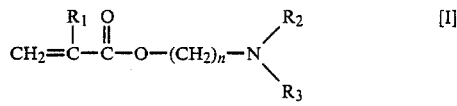

wherein $R_1$ represents a hydrogen atom or a methyl group, $R_2$ and $R_3$ independently represent a hydrogen atom or an alkyl group, or $R_2$ and $R_3$ are bonded together to form a nitrogen-containing hetero ring, and n is an integer of at least 1.

As the monomer represented by the general formula (I), there can be mentioned aminoalkyl acrylates such as dimethylaminomethyl acrylate, diethylaminomethyl acrylate, dibutylaminoethylmethyl acrylate, di-n-propylaminomethyl acrylate, methylaminomethyl acrylate, butylaminomethyl acrylate, dimethylaminoethyl acrylate, diethylaminoethyl acrylate, di-t-butylaminoethyl acrylate, methylaminoethyl acrylate, ethylaminoethyl acrylate, butylaminoethyl acrylate and dimethylaminopropyl acrylate; and aminoalkyl methacrylates such as diemthylaminoethyl methacrylate, dimethylaminopropyl methacrylate, diethylaminoethyl methacrylate, di-n-propylaminoethyl methacrylate, and piperdinoethyl methacrylate, and salts thereof. These monomers may be used singly or in the form of mixtures of two or more thereof.

As the other monomer copolymerizable with the monomer of the general formula (I), there can be mentioned alkyl esters of acrylic acid and methacrylic acid, acrylamide, methacrylamide, N-methylolacrylamide, acrylonitrile, methacrylonitrile, 2-hydroxyethyl methacrylate, styrene, $\alpha$-methylstyrene, $\beta$-methylstyrene, vinyltoluene, vinylketone, methyl vinyl ether, ethyl vinyl ether, isobutyl vinyl ether, vinyl acetate, vinyl propionate and vinyl butyrate. These copolymerizable monomers may be used singly or in combination.

An ordinary solution polymerization process is suitably adopted for obtaining the acrylic resin used in the present invention by the polymerization of the monomer. A mixture of the monomer and an alcohol type solvent or water and a polymerization initiator are charged collectively, batchwise or continuously, and the polymerization reaction is carried out under heating.

The polymer having a basic tertiary amine salt represented by the general formula (I) is effective for improving various properties in the present invention. Accordingly, when the acrylic resin used in the present invention is a copolymer, it is preferred that the copolymer should comprise at least 30% by weight, especially at least 50% by weight, of the monomer represented by the general formula (I) and up to 70% by weight, especially up to 50% by weight, of the other copolymerizable monomer.

If the amount of the monomer represented by the general formula (I) is smaller than 30% by weight, the amount of the acrylic resin added is increased and the hiding power and coloring power are reduced.

For the reason set forth above, the amount of the acrylic resin used is determined according to the resin component obtained from the monomer of the general formula (I), which is contained in the acrylic resin. It is preferred that the amount of that resin component be 0.2 to 20% by weight, especially 0.5 to 15% by weight, based on the organic pigment.

As the acid used for dissolving the acrylic resin therein and effecting neutralization and reprecipitation of the pigment, there can be used inorganic acids such as sulfuric acid and hydrochloric acid, and various organic acids. In view of the capacity of the formed pigment, sulfuric acid, hydrochloric acid and acetic acid are preferably used.

Of the neutralization and reprecipitation conditions, the temperature at the neutralization and reprecipitation step has a great influence on the particle size. Accordingly, it is necessary that the neutralization and reprecipitation should be carried out while controlling the temperature at a level suitable for obtaining the intended particle size.

At the neutralization and precipitation step, th added acrylic resin acts substantially on primary particles of the pigment to prevent an aggregation of primary particles, stabilize the dispersion state, and remarkably improve the gloss and flowability. Moreover, the acrylic resin reduces the viscosity of the pigment slurry, facilitates stirring, and promotes the effect of rendering the pigment slurry homogeneous.

The precipitation slurry obtained by neutralization and reprecipitation is gradually added to an aqueous solution of ammonia, potassium hydroxide or sodium hydroxide to form an alkaline pigment slurry. Then, the slurry is heat-treated at a temperature higher than 70° C. to render the added acrylic resin hardly water-soluble or water-insoluble.

The obtained pigment slurry is repeatedly filtered and washed with water and then dried and pulverized according to customary procedures, whereby an organic pigment having a sharp color, which has an excellent gloss, flowability, and coloring power, is obtained.

As is apparent from the foregoing description, in the process for the preparation of organic pigments according to the present invention, any aggregation of primary particles can be substantially prevented simultaneously with purification and fine division, and therefore, the properties of the pigment such as gloss, flowability, and coloring power can be effectively improved. Moreover, since the steps are very simple, the process of the present invention is economically advantageous and has an excellent operation efficiency. Accordingly, the process of the present invention is industrially advantageous.

The preparation of the acrylic resin used in the present invention will now be described in detail with reference to the following production examples. In these production examples, all of "parts" and "%" are by weight.

Production Example 1

A four-neck flask equipped with a stirrer, a thermometer, a reflux cooler and a gas-introducing tube was charged with 235 parts of dimethylaminoethyl methacrylate, 235 parts of isopropyl alcohol, and 1.7 pars of 2,2'-azobisisobutyronitrile, and polymerization was carried out at 80° C. for 4 hours while passing nitrogen gas through the flask. After the reaction had been conducted for 2 hours, 0.6 part of 2,2'-azobisisobutyronitrile was further added. Upon completion of the polymerization reaction, the reaction mixture was cooled below 50° C., and a water dilution of 152 parts of 36% hydrochloric acid was added to effect neutralization. Isopropyl alcohol was removed by distillation to obtain a viscous resin solution having a solid content of 35%.

Production Example 2

The same device as used in Production Example 1 was charged with 110 parts of dimethylaminoethyl methacrylate, 50 parts of methyl methacrylate, 60 parts of ethyl acrylate, 220 parts of isopropyl alcohol, and 1.5 parts of 2,2'-azobisisobutyronitrile, and the temperature was elevated to 80° C. while introducing nitrogen gas. Polymerization was carried out at this temperature for 4 hours. After the reaction had been conducted for 2 hours, 0.7 part of 2,2'-azobisisobutyronitrile was further added. Upon completion of the polymerization reaction, the reaction mixture was cooled below 50° C., and a water dilution of 42 parts of acetic acid was added to effect neutralization. Isopropyl alcohol was removed by distillation to obtain a viscous resin solution having a solid content of 30%.

The present invention will now be described in detail with reference to the following examples while illustrating the effect of the present invention with reference to comparative examples.

In the following examples and comparative examples, all of "parts" and "%" are by weight.

EXAMPLE 1

A flask equipped with a stirrer and a thermometer was charged with 360 parts of dimethylsulfoxide containing 10% of water, and 30 pars of crude unsubstituted quinacridone was added and the mixture stirred at room temperature to form a homogeneous slurry. Then, 13.5 parts of potassium hydroxide and 22 parts of water were added to the slurry and the mixture was stirred for 1 hour to dissolve the pigment. The temperature was elevated to 50° C., and a homogeneous sulfuric acid solution formed by adding 2.6 parts of the resin solution obtained in Production Example 1 to 23.6 parts of 50% sulfuric acid an stirring the mixture was gradually added dropwise to the slurry over a period of 30 minutes to effect neutralization and reprecipitation. After completion of the dropwise addition of the sulfuric acid solution, the mixture was aged at 50° C. with stirring for 30 minutes. The obtained precipitate slurry was poured into 500 parts of water having 0.2 part of sodium hydroxide dissolved therein and the mixture was stirred at 80° C. for 30 minutes and then filtered. The obtained pigment cake was re-dispersed in 1000 parts of water and the dispersion was filtered again. This operation of water washing and filtration was repeated 3 times, and the pigment cake was dried and pulverized to obtain a fine unsubstituted quinacridone pigment having a sharp red color.

The thus-obtained unsubstituted quinacridone pigment powder was incorporated into a melamine-alkyd resin varnish for a baking paint so that the pigment content was 10%. In the obtained paint, the dispersibility of the pigment was good, and the flowability, gloss, and coloring power were excellent.

EXAMPLE 2

The procedures of Example 1 were repeated in the same manner except that 6.0 parts of the resin solution obtained in Production Example 2 was used instead of 2.6 parts of the acrylic resin solution obtained in Production Example 1, whereby a fine unsubstituted quinacridone pigment having a sharp red color was obtained.

The obtained pigment was subjected to the same paint test as described in Example 1. It was found that the pigment had an excellent dispersibility, flowability, gloss, and coloring power.

Comparative Example 1

A red unsubstituted quinacridone pigment was obtained by repeating the procedures of Example 1 in the same manner, except that the acrylic resin solution wa not added.

When the same paint test as described in Example 1 was carried out, it was found that the obtained pigment was inferior to the pigments obtained in Examples 1 and 2 in dispersibility, flowability, gloss, and coloring power.

EXAMPLE 3

The procedures of Example 1 were repeated in the same manner except that 30 parts of crude 2,9-dimetyl-quinacridone was used instead of 30 parts of the crude unsubstituted quinacridone, whereby a fine quinacridone pigment having a sharp red violet color was obtained.

When a paint was prepared from this pigment in the same manner as described in Example 1, it was found that the pigment had an excellent dispersibility, flowability, and gloss, and the coloring power was satisfactory.

EXAMPLE 4

The procedures of Example 2 were repeated in the same manner except that 20 parts of crude unsubstituted quinacridone and 10 parts of crude 2,9-dimethylquinacridone were used instead of 30 parts of the crude unsubstituted quinacridone, whereby a fine red solid solution quinacridone pigment was obtained.

When the paint test was carried out in the same manner as described in Example 1, it was found that the pigment had a good dispersibility and an excellent flowability and gloss.

EXAMPLE 5

The procedures of Example 4 were repeated in the same manner except that the amount of the crude unsubstituted quinacridone was changed to 25 parts from 20 parts and 5 parts of C.I. Pigment Orange 36 was used instead of the crude 2,9-dimethylquinacridone, whereby a fine pigment having a yellowish red color was obtained.

When the paint test was carried out in the same manner as described in Example 1, it was found that the pigment had an excellent dispersibility, flowability, and gloss and the coloring power was satisfactory.

EXAMPLE 6

The procedures of Example 5 were repeated in the same manner except that 5 parts of C.I. Pigment Red 88 was used instead of 5 parts of C.I. Pigment Orange 36, whereby a fine pigment having a dark red color was obtained.

When the paint test was carried out in the same manner as described in Example 1, it was found that the pigment had an excellent dispersibility, flowability, gloss, and coloring power.

Comparative Examples 2 through 5

The procedures of Examples 3 through 6 were repeated in the same manner except that the acrylic resin solution was not added.

When the obtained pigments were formed into paints in the same manner as described in Example 1, it was found that these pigments were inferior to the pigments obtained in Examples 3 through 6 in dispersibility and flowability, and the gloss and coloring power of the coating films were poor.

The flowability and gloss of each of the pigments obtained in Examples 1 through 6 and the corresponding pigments obtained in Comparative Examples 1 through 5 in a thermosetting melamine-alkyd resin paint were as shown in Table 1. From the results shown in Table 1, it is seen that the pigment obtained according to the present invention has an excellent flowability and a high gloss.

TABLE 1

| Sample | Viscosity (cps) | | Gloss (20°/20°) |
|---|---|---|---|
| | 12 rpm | 60 rpm | |
| Example 1 | 530 | 490 | 95 |
| Example 2 | 532 | 485 | 94 |
| Comparative Example 1 | 2520 | 1090 | 78 |
| Example 3 | 580 | 510 | 94 |
| Comparative Example 2 | 2820 | 1150 | 77 |
| Example 4 | 610 | 570 | 95 |
| Comparative Example 3 | 2730 | 1050 | 78 |
| Example 5 | 680 | 590 | 93 |
| Comparative Example 4 | 2800 | 1280 | 77 |
| Example 6 | 720 | 605 | 93 |

TABLE 1-continued

| Sample | Viscosity (cps) 12 rpm | 60 rpm | Gloss (20°/20°) |
|---|---|---|---|
| Comparative Example 5 | 2910 | 1240 | 76 |

Note, the viscosity was measured at 25° C. by using a BM type rotary viscometer, and the gloss was measured by a gloss meter.

EXAMPLE 7

In the same device as used in Example 1, 30 parts of crude unsubstituted quinacridone were added to 300 parts of dimethylsulfoxide containing 10% of water, and the mixture was stirred at room temperature to form a homogeneous slurry. Then, 13.5 parts of potassium hydroxide and 18 parts of water were added to the slurry. The slurry was stirred for 1 hour to dissolve the pigment. The slurry was then cooled to 5° C., and a homogeneous sulfuric acid solution obtained by adding 3.4 parts of the resin solution obtained in Production Example 1 to 23.6 parts of 50% sulfuric acid and stirring the mixture was gradually added dropwise to the slurry over a period of 30 minutes to effect neutralization and reprecipitation. The obtained precipitate slurry was poured into 800 parts of water having 0.3 part of sodium hydroxide dissolved therein and the mixture was stirred at 80° C. for 30 minutes.

Filtration, water washing, drying, and pulverization were carried out in the same manner as described in Example 1, whereby a very fine unsubstituted quinacridone pigment having a dense red violet color was obtained.

The pigment was incorporated in a vinyl chloride resin varnish for a gravure ink so that the pigment content was 8%, and a gravure ink was prepared. The dispersibility of the pigment was good, and the pigment had an excellent flowability and printability characteristics, such as color sharpness, tinting power, and transparency.

EXAMPLE 8

A very fine pigment having a dense red violet color was obtained by repeating the procedures of Example 7 in the same manner except that 25 parts of crude unsubstituted quinacridone and 5 parts of C.I. Pigment Orange 36 were used instead of 30 parts of the crude unsubstituted quinacridone.

The obtained pigment was subjected to the gravure ink test in the same manner as described in Example 7. It was found that the pigment had an excellent dispersibility, coloring power, color sharpness, and transparency, and the obtained ink had an excellent flowability.

Comparative Examples 6 and 7

Pigments were prepared by repeating the procedures of Examples 7 and 8 in the same manner except that the acrylic resin solution was not added.

The obtained pigments were subjected to the same gravure ink test as described in Example 7. It was found that the pigments were inferior to the pigments obtained in Examples 7 and 8 in color sharpness, coloring power, and transparency and the inks had a poor flowability.

The flowability, color sharpness, and transparency of each of the gravure inks of the pigments of Examples 7 and 8 and the corresponding pigments of Comparative Examples 6 and 7 were as shown in Table 2.

From the results shown in Table 2, it is seen that the pigment obtained according to the present invention has an excellent flowability, color sharpness, and transparency.

TABLE

| Sample | Viscosity (cps) 12 rpm | 60 rpm | Color sharpness and transparency |
|---|---|---|---|
| Example 7 | 470 | 320 | excellent |
| Comparative Example 6 | 2200 | 850 | poor |
| Example 8 | 530 | 330 | excellent |
| Comparative Example 7 | 2420 | 910 | poor |

We claim:

1. A process for the preparation of organic pigments, which comprises dissolving at least one organic pigment in an aprotic polar solvent in the presence of a caustic alkali and water, and adding to the solution an acid having an acrylic resin dissolved therein to effect neutralization and reprecipitation; said acrylic resin being a polymer obtained by homopolymerizing a monomer represented by the following general formula or copolymerizing said monomer with another monomer copolymerizable therewith:

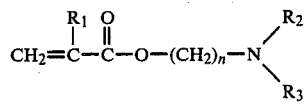

wherein $R_1$ represents a hydrogen atom or a methyl group, $R_2$ and $R_3$ independently represent hydrogen atom or an alkyl group, or $R_2$ ring, and n is an integer of atom or an alkyl group, or $R_2$ and $R_3$ are bonded together to form a nitrogen-containing hetero ring, and n is an integer of at least 1, said polymer being soluble in an acidic aqueous solution.

2. A process for the preparation of organic pigments according to claim 1, wherein the organic pigment is a quinacridone, azo or thioindigo pigment.

3. A process for the preparation of organic pigments according to claim 2, wherein the quinacridone pigment is unsubstituted quinacridone, 2,9-dimethylquinacridone, 3,10-dichloroquinacridone or 4,11-dichloroquinacridone.

4. A process for the preparation of organic pigments according to claim 1, wherein the caustic alkali is potassium hydroxide or sodium hydroxide.

5. A process for the preparation of organic pigments according to claim 1, wherein the aprotic polar solvent is dimethylsulfoxide, dimethylimidazolidinone or N-methyl-2-pyrrolidone.

6. A process for the preparation of organic pigments according to claim 1, wherein the acid is sulfuric acid, hydrochloric acid or an organic acid.

* * * * *